(12) United States Patent
Ash et al.

(10) Patent No.: US 6,461,137 B1
(45) Date of Patent: Oct. 8, 2002

(54) MOLDING APPARATUS FOR ENCAPSULATING A SHEET OF MATERIAL

(76) Inventors: Charles E. Ash, 598 S. Ridge Dr., Perrysburg, OH (US) 43551; John H. Gillen, 5830 Erie Rd., Ottawa Lake, MI (US) 49267

( * ) Notice: Subject to any disclaimer, the term of this patent is extended or adjusted under 35 U.S.C. 154(b) by 0 days.

(21) Appl. No.: 09/303,207

(22) Filed: Apr. 30, 1999

Related U.S. Application Data (63) Continuation-in-part of application No. 08/898,207, filed on Jul. 22, 1997, now Pat. No. 6,123,535
(60) Provisional application No. 60/023,007, filed on Aug. 2, 1996.

(51) Int. Cl.[7] .......................... B29C 70/76; B29C 70/78
(52) U.S. Cl. ................. 425/127; 264/252; 425/DIG. 58
(58) Field of Search .................. 264/252; 425/116, 425/117, 127, DIG. 58, 451.7

(56) References Cited

U.S. PATENT DOCUMENTS

| | | | | |
|---|---|---|---|---|
| 1,776,888 A | * | 9/1930 | Clark | 425/DIG. 58 |
| 2,324,978 A | * | 7/1943 | Lohrand et al. | 425/116 |
| 3,277,591 A | | 5/1971 | Ricards | 100/271 |
| 3,854,691 A | * | 12/1974 | Humphrey | 425/117 |
| 3,915,617 A | | 10/1975 | Saladin | 425/501 |
| 4,125,247 A | * | 11/1978 | Gabrys | 425/DIG. 58 |
| 4,354,819 A | | 10/1982 | Wirz | 425/409 |
| 4,363,191 A | | 12/1982 | Morgan | 49/381 |
| 4,396,221 A | | 8/1983 | Morgan et al. | 49/490 |
| 4,561,625 A | | 12/1985 | Weaver | 425/127 |
| 4,584,155 A | | 4/1986 | Zandella | 264/252 |
| 4,762,481 A | | 8/1988 | Weaver | 425/116 |
| 4,777,699 A | | 10/1988 | Hill et al. | 16/225 |
| 4,858,988 A | | 8/1989 | Morgan et al. | 296/201 |
| 5,108,687 A | * | 4/1992 | Jourquin et al. | 425/116 |
| 5,154,028 A | | 10/1992 | Hill et al. | 52/208 |
| 5,190,714 A | * | 3/1993 | Reinhart | 425/590 |
| 5,547,359 A | * | 8/1996 | Cordes et al. | 425/127 |
| 5,584,526 A | | 12/1996 | Soldner | 296/146.15 |

FOREIGN PATENT DOCUMENTS

| | | | |
|---|---|---|---|
| JP | 62-122719 | * | 6/1987 |
| JP | 62-196114 | * | 8/1997 |

* cited by examiner

*Primary Examiner*—Robert Davis
(74) *Attorney, Agent, or Firm*—Marshall & Melhorn, LLC (57) ABSTRACT

A mold, a molding apparatus embodying said mold, and a method of use thereof. The mold has a moveable mold core and a multi-part mold base having at least a fixed mold base and at least one moveable or slideable mold base slideable from an adjacent to an adjoining position with regard to said fixed mold base. When the moveable mold core is in its closed position the slideable mold portions are adjoining the fixed mold portion to define a mold cavity. The mold base may be shaped so as to aid in forming a part, or to hold a sheet of material onto which molding material is to be deposited so as to encapsulate the part on one or more edges or surface regions.

22 Claims, 5 Drawing Sheets

MOLDING APPARATUS FOR ENCAPSULATING A SHEET OF MATERIAL

RELATED APPLICATIONS

The present application is a continuation-in-part of United States Letters Patent Application Ser. No. 08/898,207 entitled MOLDING METHOD AND APPARATUS AND PART PRODUCED THEREBY, filed Jul. 22, 1997, now U.S. Pat. No. 6,123,535, which claims the benefit of prior provisional patent application No. 60/023,007, filed Aug. 2, 1996. The priority of application Ser. No. 08/898,207 is specifically, claimed, and the specification of the application is incorporated by reference. The priority of prior copending provisional patent application No. 60/023,007 is also specifically claimed, and the specification of Ser. No. 60/023,007 is also incorporated by reference.

BACKGROUND OF THE INVENTION

1. Field of the Invention

The present invention relates to a method and apparatus for molding. More particularly, the present invention relates to a method and apparatus for molding onto or encapsulating all or a portion of a sheet of material. Most particularly, the present invention relates to a method and apparatus for encapsulating all or part of a glass sheet for use as an automotive glazing on a single side only. The scope of the present invention will be understood to cover the products made by the disclosed method and apparatus, as well as the particular mold structure and apparatus described herein.

2. Discussion of the Related Art

In the preferred embodiments of the present invention, the molding apparatus disclosed is of the type used to mold onto or encapsulate glass sheets of the type which are commonly employed as glazed enclosures in present day vehicles, such as automobiles and the like. In addition to such glass sheets being made to precisely defined curvatures dictated by the configuration and size of the openings in the vehicle body, in order to meet strict quality standards of manufacturers, it is necessary to mold onto or encapsulate the sheet of material, such as with a gasket around a predetermined portion of the sheet of material.

U.S. Pat. No. 4,561,625 discloses a mold structure for forming a polymeric gasket around a predetermined portion of a sheet of transparent material such as glass. The mold structure includes two cooperating mold sections for defining a chamber for receiving the transparent sheet. A seal is positioned about the periphery of the chamber and is utilized to resiliently support the sheet within the chamber. Also, the seal cooperates with a predetermined portion of the transparent sheet for defining a gasket cavity having a configuration corresponding to the gasket to be formed on the sheet of transparent material.

U.S. Pat. No. 4,762,481 discloses a mold for forming a window assembly which includes a transparent glass sheet and gaskets formed by curing a polymeric gasket material in situ on the glass sheet to encapsulate a marginal peripheral edge portion thereof. A glass sheet to be utilized in a vehicle has a front edge, rear edge, and a lower edge, to each of which is adhered such a gasket. In addition, a bracket means for attachment to a scissor linkage for raising and lowering the window can be secured to the lower edge of the window.

U.S. Pat. No. 4,584,155 discloses a method for molding surface structure onto the surface of the glass sheet.

U.S. Pat. No. 5,108,687 discloses a device for at least partially encapsulating a border of a substantially sheet shaped element. The device contains a cavity formed by an elastically deformable member having a profile which extends along an encapsulation border line of the element, and which is adapted to be elastically deformed while maintaining a tight contact along the encapsulation border line when pressure is applied thereon, in order to follow irregularities in the element along the border line.

The co-pending application of applicant's assignee, Ser. No. 08/898,207, filed Jul. 22, 1997 and entitled "Molding Method and Apparatus and Part Produced Thereby" shows a molding apparatus having a mold base and at least one moveable mold core rotatable into and out of a facing relationship with the mold base. When the moveable mold core is in its closed position, it cooperates with the mold base to define a mold cavity. The mold base may be shaped so as to aid in forming a part, or to hold.the sheet of material onto which molding material is to be deposited so as to encapsulate the part on one or more edges or surface regions. Structure may also be encapsulated onto the surface of the material during the molding operation.

The co-pending provisional application of applicants' assignee, Ser. No. 60/111,467, filed Dec. 9, 1998 shows a compact molding press which may hold the mold shown in the present invention.

The above-mentioned patents show various window assemblies and methods to make the same. The apparatus to make the devices shown often involve complicated molding presses dedicated to making a single part, whereby the molding presses can not accept other molds, and the molds in said molding presses can not be installed on other molding presses. This results in increased expense in the molding process.

Thus, those skilled in the art continued to search for a molding method and apparatus which could easily be used in a wide variety of molding presses, thus, eliminating the need for costly and specialized machinery.

SUMMARY OF THE INVENTION

The aforementioned problems are addressed in accordance with the present invention by the utilization of a novel molding method and apparatus not hereto found in the prior art. In its broadest form, the mold of the present invention may be used in a wide variety of commercially available molding presses, thus eliminating the need for dedicated and/or complicated molding presses, and thereby reducing expenses.

In one embodiment of the present invention, a mold for molding a part is provided. The mold includes a multi-part mold base having a mold base plate, at least one fixed mold base on said mold base plate, and at least one slidable mold base on said mold base plate. The slidable mold base is adjacent to the fixed mold base of the mold in its open position, and moves into and out of an adjoining position with respect to fixed mold base. The multi-part mold base is used in combination with a mold core having at least a portion of a mold cavity formed therein. The mold core is moveable between an open position in a facing relationship with said multi-part mold base, and a closed position in an adjoining relationship with the multi-part mold base. When the mold core is in its closed position there is at least a portion of a mold cavity adjacent the multi-part mold base, and at least one slidable mold base adjoining the fixed mold base.

In another embodiment of the invention a mold for encapsulating a sheet of material is shown. The mold includes a multi-part mold base in which a sheet of material to be encapsulated is supported. The multi-part mold base includes a mold base plate, at least one fixed mold base on said mold base plate, and at least one slidable mold base on said mold base plate. The slidable mold base is adjacent to the fixed mold base in its open position, and moves into and out of an adjoining position with respect to fixed mold base. The multi-part mold base is used in combination with a mold core having at least a portion of a mold cavity formed therein. The mold core is moveable between an open position in a facing relationship with said multi-part mold base, and a closed position in an adjoining relationship with the multi-part mold base. When the mold core is in its closed position there is at least a portion of a mold cavity adjacent the multi-part mold base, and at least one slidable mold base adjoining the fixed mold base.

In a further embodiment of the present invention a mold for encapsulating a sheet of glass on a single side is shown. The mold includes a multi-part mold base in which the sheet of glass to be encapsulated is supported. The multi-part mold base includes a mold base plate, at least one fixed mold base on said mold base plate, and at least one slidable mold base on said mold base plate. The slidable mold base is adjacent to the fixed mold base in its open position, and moves into and out of an adjoining position with respect to fixed mold base. The multi-part mold base is used in combination with a mold core having at least a portion of a mold cavity formed therein. The mold core is moveable between an open position in a facing relationship with said multi-part mold base, and a closed position in an adjoining relationship with the multi-part mold base. When the mold core is in its closed position there is at least a portion of a mold cavity adjacent the multi-part mold base, and at least one slidable mold base adjoining the fixed mold base portion.

In a still further embodiment of the invention, an apparatus is shown for encapsulating a sheet of glass on one surface only. A multi-part mold base will have a mold base plate, and fixed mold base mounted on said mold base plate. The mold will further include a plurality of slidable mold bases mounted on said mold base plate adjacent to the fixed mold base. Each of the plurality of slidable mold bases may be in a normally open position adjacent the fixed mold base, and can be moveable into and out of an adjoining position with respect to said fixed mold base. A sheet of glass will be placed in position in the fixed mold base. Each of said plurality of slidable mold bases may be closed. A seal carried by the plurality of slidable mold base portions of the fixed mold base will seal the edge region of the glass to prevent material from molding onto or encapsulating the edge region. Cooperating with the multi-part mold base is a moveable mold core having at least a portion of a mold cavity formed therein. The mold core is moveable between an open position in a facing relationship with the multi-part mold base, and a closed position in an adjoining relationship with the multi-part mold base. At least a portion of a mold cavity is formed in said mold core and is adjacent the multi-part mold base when said moveable mold core is its closed position. Once the sheet of glass to be encapsulated is placed in the fixed mold base, the moveable mold core will move to its closed position, at least some of said plurality of slideable mold bases will close, and molding material will be introduced into a mold cavity formed by the glass sheet the mold core, the fixed mold base, and the slideable mold bases. After the molding process, the glass sheet will be removed, and will have encapsulation on one side or surface only.

In a further embodiment of the present invention an apparatus is provided which incorporates a mold of the foregoing nature.

In another embodiment of the present invention, a method of encapsulating a sheet of glass on one edge only, in accordance with-the above description, is provided.

Thus, one of the objectives of the present invention is to provide a novel mold for molding a part.

Another object of the present invention is to provide a novel mold for encapsulating a sheet of material. Another object of the present invention is to provide a novel mold structure for encapsulating a sheet of glass on a single side.

A still further object of the present invention is to provide a novel molding method for encapsulating a sheet of glass on a single side.

A still further object of the present invention is to provide an apparatus for holding the novel mold structure of the present invention.

Further objects and advantages of this invention will be apparent from the following description and dependent claims, reference being made to the accompanying drawings forming a part of the specification, wherein like reference characters designate corresponding parts in the several views.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

It is to be understood that the present invention is not limited in its application to the details of construction and arrangement of parts illustrated in the accompanying drawings, since the invention is capable of other embodiments, and of being practiced or carried out in various ways within the scope of the claims. Also it is to be understood that the phraseology and terminology employed herein is for the purpose of description, and not of limitation.

DESCRIPTION OF THE PREFERRED EMBODIMENT

Figure 1:
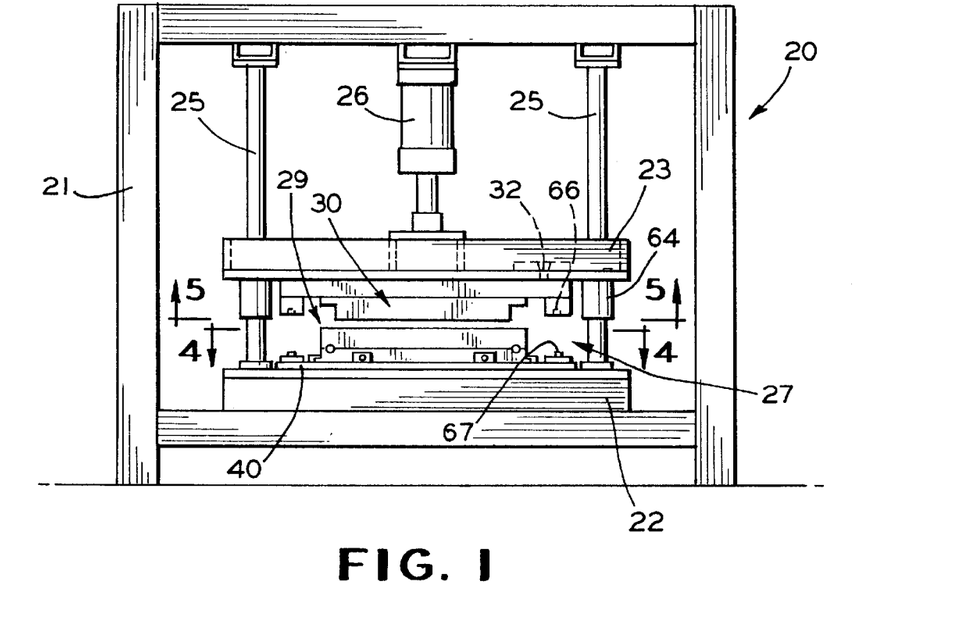
FIG. 1 is an elevational view of an apparatus embodying the construction of the present invention.

Referring now in detail to the illustrative embodiment depicted in the accompanying drawings, there is shown in FIG. 1 a known horizontal molding press, generally designated by the numeral 20, and including a frame 21, a fixed lower mold platen 22, and a moveable upper mold platen 23. The moveable upper mold platen reciprocates on a plurality of tie bars 25, and is powered for reciprocal movement by fluid cylinder 26. Fluid cylinder 26, together with well known fluid power components (not shown), comprise means to move the moveable upper mold platen 23 from its open position to its closed position, and vice versa, as desired.

Mounted in horizontal molding press 20 is mold 27. Mold 27 consists of a multi-part mold base 29 fixedly, but removably, attached to fixed lower mold platen 22, and a moveable mold core 30 fixedly, but removably, attached for reciprocating movement to moveable upper mold platen 23. Injection port 32 provided in moveable upper mold platen 23, and in fluid communication with moveable mold core 30, allows for the injection of molding material into the mold 27.

Figure 2:
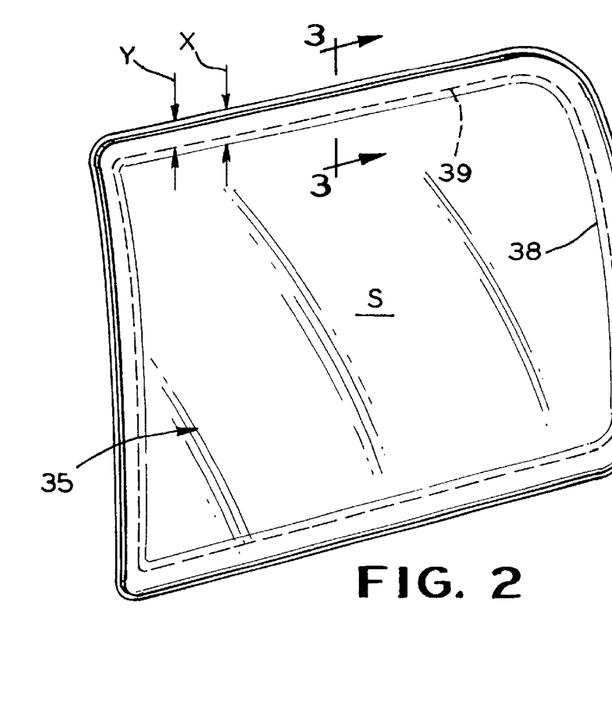
FIG. 2 is a perspective view of a part which may be manufactured according to the method of the present invention.

A sheet a of material to be encapsulated may be such as the automotive vehicle side light 35, shown in FIG. 2 after the molding process. In the illustrated embodiment, the novel mold of the present invention is shown being used for single sided encapsulation. However, it should be understood that the present invention may a) mold a part, b) encapsulate a sheet of material, or c) encapsulate one or more sides of a sheet of glass, and be well within the scope of the present invention.

Figure 3:
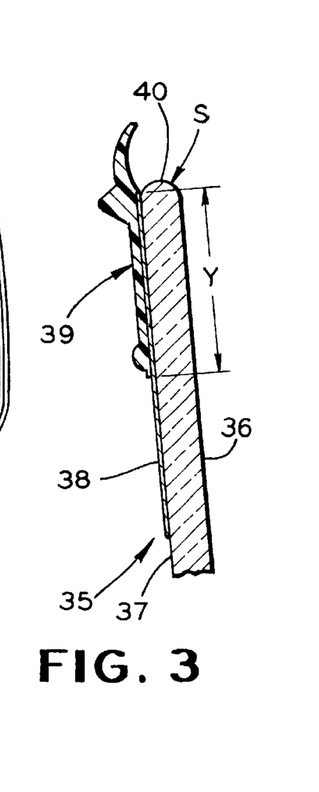
FIG. 3 is a sectional view, taken in the direction of the arrows, along the section line of 3—3 of FIG. 2.

The finished automotive side light 35 has a plain front surface 36, and a rear surface 37 having a ceramic enamel band 38 applied thereto for distance X before insertion into the mold 27.

After the molding process takes place, in a manner to be described in detail below, the entire perimeter of the rear surface 37 of the automotive side light 35 is encapsulated for a distance Y with a gasket 39 applied over the ceramic enamel band 38. The front surface 36 is completely free of molding material, as is the edge 40 of the side light 35.

Figure 4:
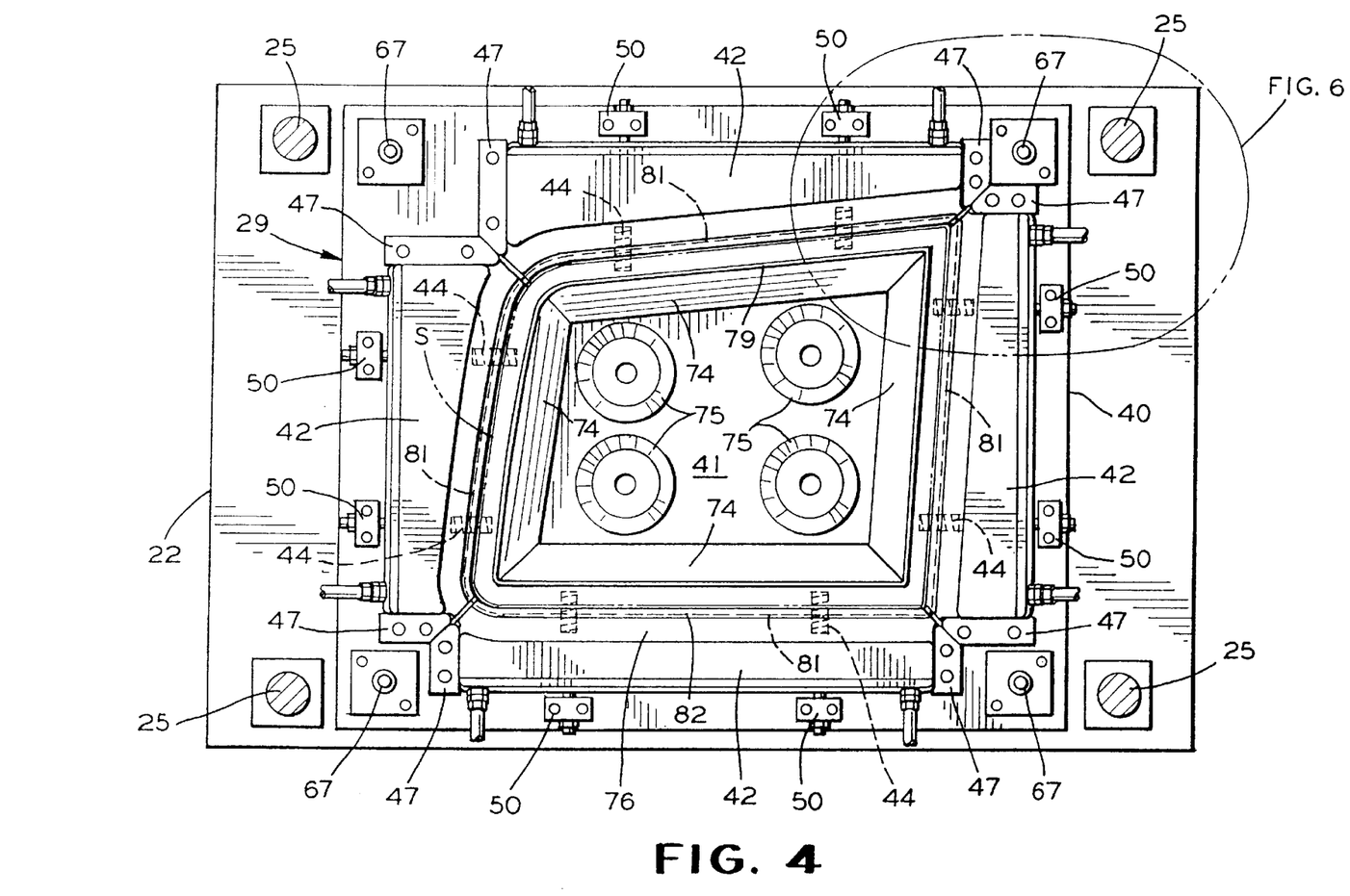
FIG. 4 is a sectional view, taken in the direction of the arrows, along the section line 4—4 of FIG. 1.

Referring now to FIGS. 1 and 4–10 the present invention is described in more detail. Referring specifically to FIG. 4, there is shown multi-part mold base 29 fixedly, but removably, attached by means well known in the art to the fixed lower mold platen 22. The multi-part mold base 29 may include such as a mold base plate 40 to which is fixedly attached a fixed mold base 41. Surrounding the fixed mold base portion 41 is a plurality of slidable mold bases 42. In FIG. 4 the slidable mold bases 42 are shown in their normally open position adjacent the fixed mold base 41. The slidable mold bases 42 are biased away from the fixed mold base 41 by springs 44 in a manner to be described in more detail herein. Each of said plurality of slidable mold bases 42 has at least one flange 46 (FIG. 9) which is engaged by complimentary shaped retainer 47. In the preferred embodiment illustrated there is a flange 46 at each end of each slidable mold base 42. Each flange 46 is engaged by a complimentary shaped retainer 47 in a manner which provides for reciprocating movement of the slidable mold bases 42. The slidable mold bases 42 reciprocate between a closed adjoining (touching) relationship with the fixed mold base 41, and an adjacent, open, relationship, as determined by the adjustable stops 50.

Figure 7:
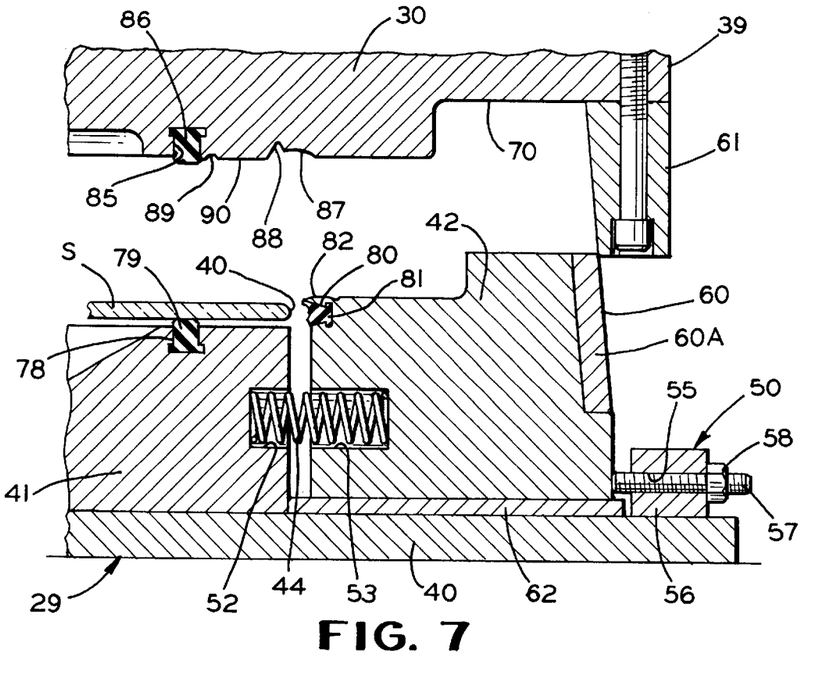
FIG. 7 is a sectional view, taken in the direction of the arrows, along the section line 7—7 of FIG. 6.

Referring to FIG. 7, each adjustable stop 50 is fixedly attached to the mold base plate 40 by any of many ways well known in the art. A plurality of springs 44, carried by an equal plurality of base spring pockets 52 and slidable spring pockets 53 keep the slidable bases 42 in an open, biased away from, or adjacent (non-touching) relationship with the fixed mold base 41. The amount of travel permitted the slidable mold bases 42 is limited by the adjustable stops 50. Each adjustable stop 50 has a threaded aperture 55 in a stop block 56. A threaded stud 57 is threaded into the aperture 55 to the extent desired, and a lock nut 58 is threaded onto the threaded stud 57 and tightened to maintain the position of the stud once adjusted. Loosening the adjustable lock nut 58 permits the threaded stud 57 to be adjusted as desired.

Another function of the adjustable stops 50 is to keep the cam follower 60, which may be mounted on each of the plurality of the slideable mold bases 42 in proper position to be acted on by cams 61 mounted on the moveable mold core 30. It can be understood that as the moveable mold core 30 moves between its opened and closed position by reciprocation on the tie bars 25, cams 61 will operate on cam followers 60 to move the slidable mold bases 42 between their open or adjacent position with respect to the fixed mold base 41, and their closed or adjoining position with respect thereto.

To increase the wear properties of the mold 27, a cam follower wear plate 60A is provided or interposed between each cam follower 60 and its respective slidable mold base 42. Likewise, a slide wear plate 62 may be provided or interposed between each slidable mold base 42, and the mold base plate 40.

Figure 5:
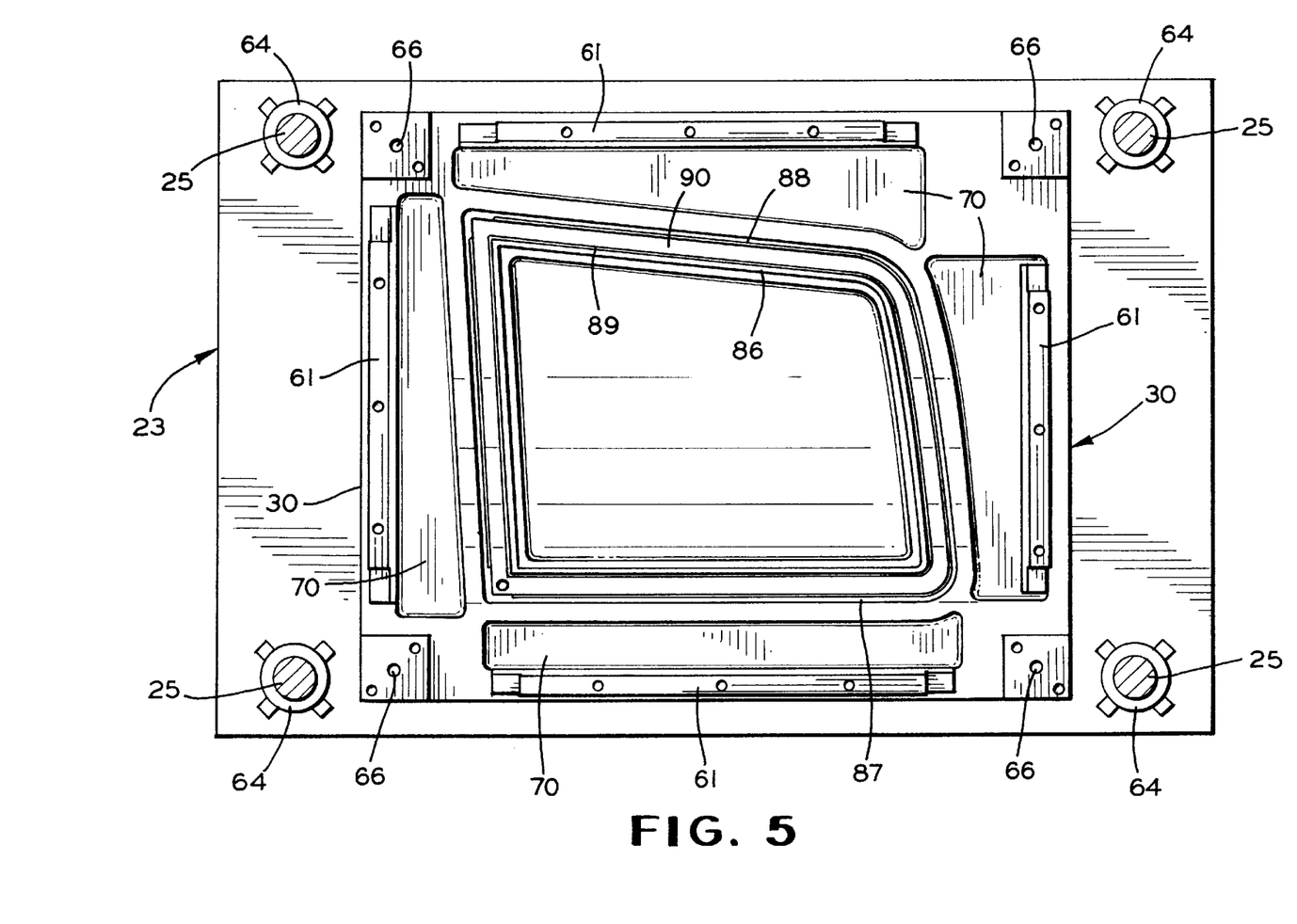
FIG. 5 is a sectional view, taken in the direction of the arrows, along the section line 5—5 of FIG. 1.
Figure 6:
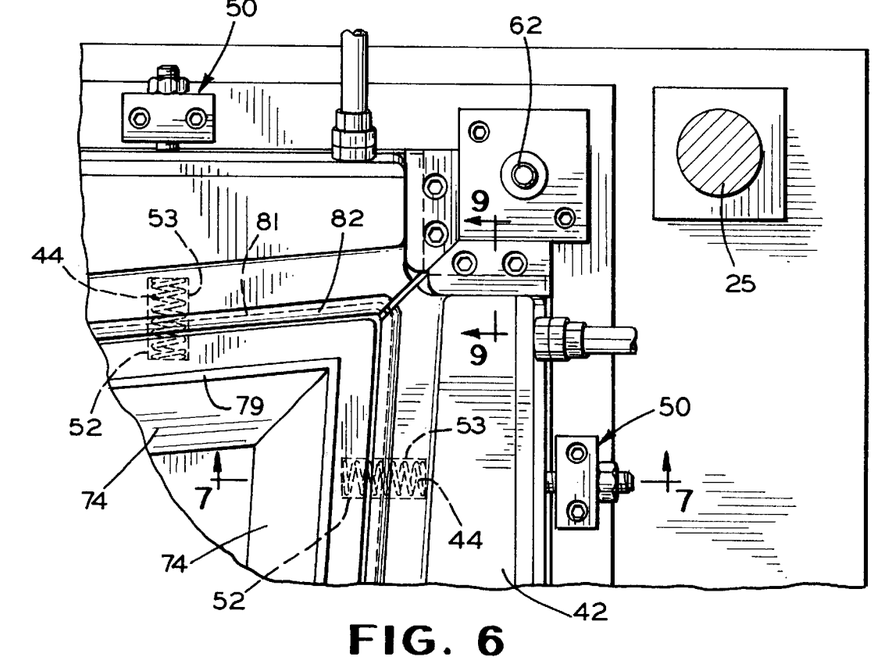
FIG. 6 is an enlarged view of the area indicated by the view circle 6 in FIG. 4.

Referring now to FIG. 5 the moveable mold core 29 is shown in more detail. Moveable mold core 29 is fixedly mounted to the moveable upper mold platen 23. Moveable upper mold platen 23 reciprocates on tie bars 25 with the aid of bearings 64. Proximate each corner of the moveable mold core 30 may be mounted a locating pin cavity 66 to accept a complimentary shaped locating pin 67 (FIG. 6) mounted proximate each corner of the multi-part mold base 29, adjacent the complimentary shaped retainers 47.

Recesses 70 (FIGS. 5,7) may be provided in moveable mold core 30 to provide clearance for the multi-part mold base 29, and more specifically for the slidable mold bases 42. Cams 61 are shown mounted in, or adjacent, the recesses 70, but may be mounted in any desired position depending on the application.

Figure 8:
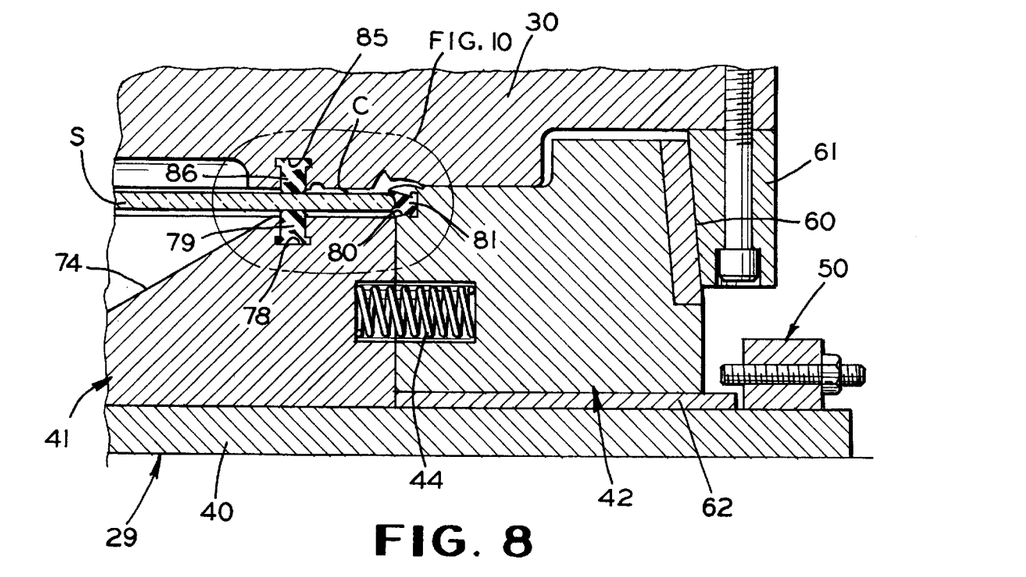
FIG. 8 is a view similar in large part to FIG. 7, but showing the mold core in its closed position.
Figure 9:
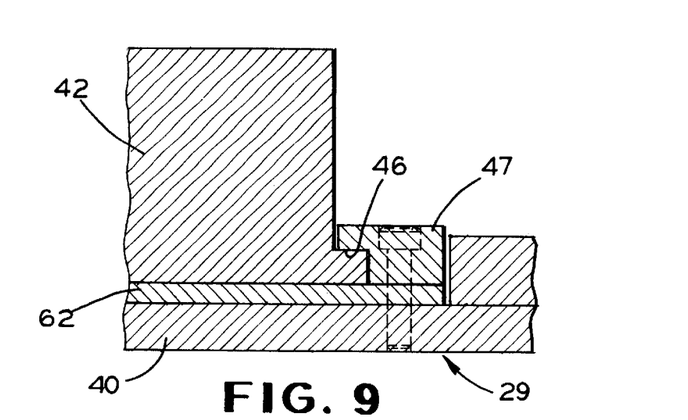
FIG. 9 is a sectional view, taken in the direction of the arrows, along the section line 9—9 of FIG. 6.
Figure 10:
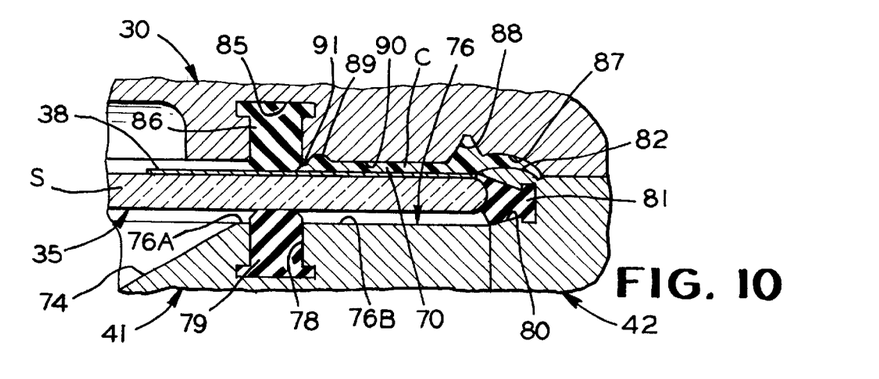
FIG. 10 is an enlarged view of the area shown within the view circle FIG. 10 in FIG. 8.

With reference to FIGS. 8 and 10, the details of the mold cavity C being used to produce the side light 35 can be clearly seen. The shape and extent of the mold cavity C, into which molding material 71 is introduced, is defined by the shape of the frangible sheet A, which may include enamel band 38, moveable mold core 30, slidable mold bases 42, and fixed mold base 41.

More particularly, the fixed mold base 41 of mold 27 has a slanted surface 74 extending about an inner perimetrical portion thereof. Inwardly of the slanted surface 74 are mounted one or more vacuum heads 75. A horizontal portion 76 has a first portion 76A, and a second portion 76B, separated by a support gasket groove 78. A support gasket 79 is mounted in support gasket groove 78.

A slideable mold base 42, shown in its closed, adjoining, position in FIGS. 8 and 10, has a side seal groove 80 in which is carried a side seal 81. Slideable mold base 42 also carries a material shaping surface 82.

Moveable mold core 30 has a cavity seal groove 85, which may be of the same shape as support gasket groove 78, and be in a 180° opposed position, or mirror image, if desired. Carried in cavity seal groove 85 is cavity seal 86. Moveable mold core 30 additionally has a complemental material shaping surface 87, a substantially V shaped recess 88, a dome shaped recess 89, second material shaping surface 90, and third material shaping surface 91.

The frangible sheet a, such as side light 35, is supported in the fixed mold base 41 by the vacuum heads 75 and the support gaskets 79. Referring to FIGS. 4, 8, and 10, as the slideable mold bases 42 are closed by the action of the cams 61 on the cam followers 60, the side seal gaskets 81 come into contact with edge 40 of side light 35 about the entire edge 40 of the side light 35.

With the mold core 30 in its closed position, it can be seen that the mold cavity C is defined by the various shapes of the mold previously described, as well as the enameled band 38 on the side light 35. More specifically, in the embodiment illustrated, the mold cavity is formed by the cavity seal groove 85, the ceramic enameled band 38, a portion of the side seal 81, the material shaping surface 82, the complemental material shaping surface 87, the substantially shaped V-shaped recess 88, the second material shaping surface 90, dome shaped recess 89, and the small third material shaping surface 91.

According to the method of the present invention the moveable mold core 30 will be in its spaced apart, open, facing position with multiple part mold base 29. Each of the plurality of the slideable mold bases 42 of the multi-part mold base 29 will be in their normally open, adjacent, position with respect to the fixed mold base 41. A sheet of glass 5 will be loaded into the fixed mold base 41 and supported therein by the vacuum heads 75 and the support gasket 79. Means will known in the art will control and supply vacuum to vacuum heads 75.

Suitable control means and fluid power sources, also well known in the art, will be used to lower moveable mold core 30 into a facing, adjacent, or adjoining, position with the fixed mold base 41. This causes the slideable mold bases 42 to come into an adjoining relationship with the fixed mold base 41, and the side seal gasket 81 to seal against the edge 40 of the side light 35.

At this point, mold 27 is completely closed, as shown in FIG. 10. The cavity seal groove 85, ceramic enamel band 38, side seal 81, material shaping surface 82, complemental material shaping surface 87, substantially V-shaped recess 88, second material shaping surface 90, dome shaped recess 89, and third material shaping surface 91 form the mold cavity c. A molding material 71 will be introduced to the mold cavity C through the mold sprue or opening 32 (FIG. 1). The mold 27 will remain closed for a suitable curing or cooling time, after which the moveable mold core 30 will be opened, allowing the slideable mold bases 42 to move away from the fixed mold base 41 by virtue of the action of the springs 44. The vacuum will be released from the vacuum heads 75, and the sheet of glass i, such as the side light 35, will be removed from the mold.

An apparatus for practice of the present invention may be the horizontal mold press 20 shown in FIG. 1, in which the mold 27 is mounted. It can be understood from the foregoing description that the mold 27 is easily used in a variety of known molding presses, all of which are well within the scope of the present invention. Thus, by carefully analyzing problems present in the molding art, a novel mold has been produced, as well as a novel method and apparatus for use with the mold. The product made by the method or process disclosed in the present application is also well within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:
1. A mold for encapsulating a sheet of material including:
   a) a multi-part mold base, a sheet of material to be encapsulated being supported in said multi-part mold base, said multi-part mold base including:
      i) a mold base plate,
      ii) at least one fixed mold base connected to said mold base plate, said at least one fixed mold base-having space to accommodate said sheet of material, and
      iii) at least one slidable mold base connected to said mold base plate, said at least one slideable mold base adjacent to said at least one fixed mold base, and movable into, and out of, a substantially adjoining position with respect to said fixed mold base portion, and
   b) a mold core having at least a portion of a mold cavity formed therein, and moveable between an open position in a facing relationship with said multi-part mold base, and a closed position in a substantially adjoining relationship with said multi-part mold base, said at least a portion of a mold cavity being adjacent said multi-part mold base, and said at least one slidable mold base adjoining said at least one fixed mold base when said mold core is in its' closed position, said sheet of material to be encapsulated between said multi-part mold base and said mold-core.

2. A mold for encapsulating a sheet of glass on a single side only, including:
   a) a multi-part mold base, a sheet of glass to be encapsulated being supported in said multi-part mold base, said multi-part mold base including:
      i) a mold base plate,
      ii) a fixed mold base connected to said mold base plate, said sheet of glass being supported on said fixed mold base, and
      iii) a plurality of slidable mold bases slideably connected to said mold base plate, said plurality of slideable mold bases being adjacent to said at least one fixed mold base, and movable into, and out of, a substantially adjoining position with respect to said fixed mold base, and
   b) a moveable mold core having at least a portion of a mold cavity formed therein, and moveable between an open position in a facing relationship with said multi-part mold base, and a closed position in a substantially adjoining relationship with said multi-part mold base, said at least a portion of a mold cavity being adjacent said multi-part mold base, and each of said plurality of slidable mold bases adjoining said at least one fixed mold base portion when said mold core is in its' closed position, said sheet of glass to be encapsulated between said multi-part mold base and said mold core.

3. A mold for encapsulating a sheet of glass on a single side only, including:
   a) a multi-part mold-base, a sheet of glass to be encapsulated being supported in said multi-part mold base, said multi-part mold base including:
      i) a mold-base plate,
      ii) a fixed mold base connected to said mold base plate, and
      iii) a plurality of slidable mold bases slideably connected to said mold base plate, said plurality of slideable mold bases being adjacent to said fixed mold base, and movable into, and out of, a substantially adjoining position with respect to said fixed mold base, and
   b) a moveable mold core having at least a portion of a mold cavity formed therein, and moveable between an open position in a facing relationship with said multi-part mold base, and a closed position in a substantially adjoining relationship with said multi-part mold base, said at least a portion of a mold cavity being adjacent said multi-part mold base, and each of said plurality of slidable mold bases adjoining said fixed mold base plate when said mold core is in its' closed position, said sheet of glass to be encapsulated between said multi-part mold base and said mold core;

(c) a flange provided on each of said plurality of slidable mold bases.

4. The mold defined in claim 3, and further including:

a) a complementary shaped retainer mounted to said mold base plate proximate each end of each of said plurality of slideable mold bases and engaging each of said flanges.

5. The mold defined in claim 4, wherein said fixed mold base includes:

a) at least one base spring pocket.

6. The mold defined in claim 5, wherein each of said slideable mold bases include:

a) at least one slidable spring pocket in a 180° opposed relationship to each of said base spring pockets.

7. The mold defined in claim 6, wherein a spring is interposed between each of said base spring pockets and each of said slidable spring pockets to bias each of said plurality of slideable mold bases to a normally open position adjacent said fixed mold base.

8. The mold defined in claim 7, and further including:

a) a plurality of adjustable stops to limit the travel of said plurality of slideable mold bases away from said fixed mold base.

9. The mold defined in claim 8, wherein each of said adjustable stops comprise:

a) a stop block affixed to said mold base plate, a threaded aperture provided in said stop block, b) a threaded stud threaded into said aperture to extend past the end of said stop block and contact said slideable mold base, and c) a lock-nut threaded onto said stud and contacting the other end of said stop block.

10. The mold defined in claim 2, wherein each of said slideable mold bases include a cam follower.

11. The mold defined in claim 10, wherein said moveable mold core further includes:

a) a cam mounted on said movable mold core in a position adjacent each of said cam followers, said cam acting on said cam follower to move each of said slideable mold bases from its position adjacent said fixed mold base to its position adjoining said fixed mold base as said moveable mold core moves from its open position to its closed position.

12. The mold defined in claim 11, wherein said cam follower includes a wear plate.

13. The mold defined in claim 12, wherein a wear plate is interposed between each of said slideable mold bases and said mold base plate.

14. The mold defined in claim 13, wherein each of said slideable mold bases includes:

a) a side seal groove, b) a side seal gasket carried in said side seal groove, said side seal gasket sealing a portion of the edge region of said sheet of glass to be encapsulated when said slideable mold base is in its' closed position adjoining said fixed mold base.

15. The mold defined in claim 14, wherein said mold base includes:

a) a gasket groove, b) a support gasket carried in said gasket groove, said support gasket supporting said sheet of glass to be encapsulated.

16. The mold defined in claim 15, wherein said moveable mold core further includes:

a) a cavity seal groove in a 180° opposed relationship to said support gasket in said fixed base, b) a cavity seal gasket carried in said cavity seal groove, said cavity seal groove sealing against said sheet of glass to be encapsulated when said moveable mold core is in its closed position, and thereby defining a portion of a mold cavity.

17. The mold defined in claim 16, wherein said mold cavity formed in said mold core further includes:

a) a cavity surface, and b) a complemental material shaping surface.

18. The mold defined in claim 17, wherein said mold cavity further includes:

a) a material shaping surface formed on each of said plurality of slidable mold bases.

19. The mold defined in claim 18, wherein:

a) said fixed mold base includes at least one vacuum head to releasably secure said sheet of glass to be encapsulated.

20. The mold defined in claim 19, wherein:

a) a fluid passage is provided in each of said plurality of slideable mold bases to heat or cool said slideable mold base portion of said mold as desired.

21. The mold defined in claim 20, further including means to introduce molding material into said mold cavity.

22. An apparatus for encapsulating a sheet of material including:

(a) a mold, said mold including:

(i) a multi-part mold base, a sheet of material to be encapsulated being supported in said multi-part mold base, said multi-part mold base including:

(a) a mold base plate, (b) at least one fixed mold base on said mold base plate, and (c) at least one slidable mold base on said mold base plate, said at least one slidable mold base adjacent to said at least one fixed mold base, and movable into, and out of, a substantially adjoining position with respect to said fixed mold base, and (b) a mold core moveable between an open position in a facing relationship with said multi-part mold base, and a closed position in a substantially adjoining relationship with said multi-part mold base, said at least one slidable mold base adjoining said at least one fixed mold base when said mold core is in its' closed position, the closure of said mold core having moved said at least one slidable mold base between its' open and its' closed position, (c) means to move said moveable mold core from its' open position to its' closed position, and vice versa, as desired, (d) means to introduce molding material into said mold, and (e) control means to control said means to open and close and said means to introduce.

* * * * *